United States Patent
Tang et al.

(10) Patent No.: US 8,770,803 B2
(45) Date of Patent: Jul. 8, 2014

(54) REFLECTIVE COVER MOLDING METHOD AND REFLECTIVE COVER MANUFACTURED THEREOF

(71) Applicants: Ledlink Optics, Inc., New Taipei (TW); Ledlink Optics (Dong Guan) Co., Ltd., Guangdong (CN); Yang Zhou Ledlink Optics Co., Ltd., Jiangsu Province (CN)

(72) Inventors: Te-Lung Tang, New Taipei (TW); Wei-Chiang Huang, New Taipei (TW)

(73) Assignees: Ledlink Optics, Inc., New Taipei (TW); Ledlink Optics (Dong Guan) Co. Ltd., Guangdong (CN); Yang Zhou Ledlink Optics Co., Ltd., Jiangsu Province (CN)

( * ) Notice: Subject to any disclaimer, the term of this patent is extended or adjusted under 35 U.S.C. 154(b) by 67 days.

(21) Appl. No.: 13/675,291

(22) Filed: Nov. 13, 2012

(65) Prior Publication Data

US 2014/0133161 A1    May 15, 2014

(51) Int. Cl.
*F21V 29/00*    (2006.01)
(52) U.S. Cl.
USPC ................. 362/342; 362/612; 362/616
(58) Field of Classification Search
USPC ............ 362/342, 218, 223; 427/66, 533–539, 427/553–559, 256, 258–265, 271–278, 427/372.2, 284–397
See application file for complete search history.

(56) References Cited

U.S. PATENT DOCUMENTS 8,616,723 B2 * 12/2013 Zhang et al. ................. 362/218

FOREIGN PATENT DOCUMENTS

| CN | 101653337 A | 2/2010 |
| CN | 101817048 A | 9/2010 |

\* cited by examiner

*Primary Examiner* — Tracie Y Green
(74) *Attorney, Agent, or Firm* — Rosenberg, Klein & Lee

(57) ABSTRACT

A reflective cover molding method and a reflective cover manufactured thereof are disclosed. The reflective cover molding method comprises the steps of: providing a metal substrate; setting the metal substrate on a substrate mold, and punching the metal substrate by a pressure to form a circular substrate; propping the circular substrate onto a fixed mold with a prop; jointly rotating the fixed mold and the circular substrate, applying a pressure by a spinning roller to attach the circular substrate, and applying a pressure to spin out a molded cover; setting the molded cover onto a shaped mold, and punching the molded cover by a pressure to form an optical structure surface on the molded cover; and punching the molded cover to remove a bottom hole to form the reflective cover, so as to accelerate production rate and enhance product quality, stability and precision.

9 Claims, 4 Drawing Sheets

REFLECTIVE COVER MOLDING METHOD AND REFLECTIVE COVER MANUFACTURED THEREOF

BACKGROUND OF THE INVENTION

1. Field of the Invention

The present invention relates to the technical field of illumination, and more particularly to a reflective cover molding method and a reflective cover manufactured thereof, and the reflective cover can be manufactured with higher precision, quality and stability according to different sizes, appearances or surface structure and lower the defective rate and cost of the manufacturing procedure.

2. Description of the Related Art

In general, optical products and functions vary according to user requirements, so that different factors are taken into consideration for the manufacture of LED lamps to meet the requirements and functions. For example, users pay more attention on the appearance, shape, size of the product, and manufacturers focus on the design of the emission angle, precision, error and intensity of the LED lamps.

Most LED lamps are designed with a reflective cover (or a reflection cover), and most conventional reflective covers are manufactured directly by punching, plastic injection or traditional spinning method. Wherein, the punching manufacture involves a more difficult technical skill and incurs a higher manufacturing cost, since the punching manufacture requires more manufacturing time and it is not applicable for all shapes of reflective covers, so that the quality of the reflective covers manufactured solely by the punching method is lower than others. On the other hand, the manufacture of the plastic reflective covers by the conventional plastic injection method has a higher level of difficulty, and thus incurring higher cost and selling price, and products manufactured by different materials require a longer manufacturing time, and has a lower production capacity. Although the reflective covers manufactured by the conventional spinning method incurs a lower manufacturing cost, yet this method produces products with a lower production capacity and a higher defective rate, and the product quality is unstable due to human factors.

In the prior art, the technique of combining the punching and spinning methods has been applied in the fields of manufacturing pressure cookers (as disclosed in P.R.C. Pat. No. CN101653337) and pulleys (as disclosed in P.R.C. Pat. No. CN101817048A). However, the technical field of the reflective cover is not related to those described above, and reflective covers have not been made by the process that combines the punching and spinning methods. Since the reflective cover has high-precision lines on an optical surface, therefore a reflective cover molding method and a reflective cover manufactured thereof are urgently required for the industrial application.

SUMMARY OF THE INVENTION

In view of the problems of the prior art, it is a primary objective of the present invention to overcome the problems of the prior art by providing a reflective cover molding method and a reflective cover manufactured thereof.

To achieve the foregoing objective, the present invention provides a reflective cover molding method for manufacturing a reflective cover, and the reflective cover molding method comprises the steps of: providing a metal substrate; setting the metal substrate on a substrate mold, and stamping the metal substrate to form a circular substrate; propping the circular substrate onto a fixed mold by a propping column; jointly rotating the fixed mold and the circular substrate, applying a pressure by a spinning roller to attach the circular substrate, and stamping to spin out a molded cover; setting the molded cover onto a shaped mold, and punching the molded cover by a pressure to form an optical structure surface on the molded cover; and punching the molded cover to remove a bottom hole to form the reflective cover.

After a pressure is applied to punch the metal substrate, the circular substrate with an inner hole is formed.

When the spinning roller approaches the circular substrate by applying a pressure, a pressure is applied onto the circular substrate to spin and form the molded cover with an inner sidewall and an outer sidewall.

When a pressure is applied to punch the molded cover, the optical structure surface is formed on the inner sidewall of the molded cover.

After the bottom hole is cut from the molded cover, a polishing process is executed on the inner sidewall of the molded cover.

After the molded cover is polished, an anode processing is executed to a surface of the molded cover to form an oxide film layer.

When a pressure is applied to punch the molded cover, the optical structure surface with a spiral grid structure, a rhombus grid structure, a rectangular grid structure or a hexagonal grid structure is formed on the inner sidewall of the molded cover.

To achieve the aforementioned objective, the present invention further provides a reflective cover manufactured by the aforementioned reflective cover molding method, and the reflective cover comprises a molded cover and a bottom hole, wherein the bottom hole is formed at the bottom of the molded cover, and an optical structure surface is formed on an inner sidewall of the molded cover.

Wherein, the optical structure surface is a spiral grid structure, a rhombus grid structure, a rectangular grid structure or a hexagonal grid structure.

In the reflective cover molding method and the reflective cover manufactured thereof in accordance with the present invention, a higher precision of the production skill provides a better flexibility of the production based on different manufacturing requirements such as the size, appearance and line on the optical surface of the reflective cover. With the reflective cover molding method of the present invention, a reflective cover with a high precision can be manufactured, so as to provide a better quality and stability of the reflective cover and lower the defective rate of the manufacturing process.

DETAILED DESCRIPTION OF THE PREFERRED EMBODIMENTS

The technical contents of the present invention will become apparent with the detailed description of preferred embodiments and the illustration of related drawings as follows.

Figure 1:
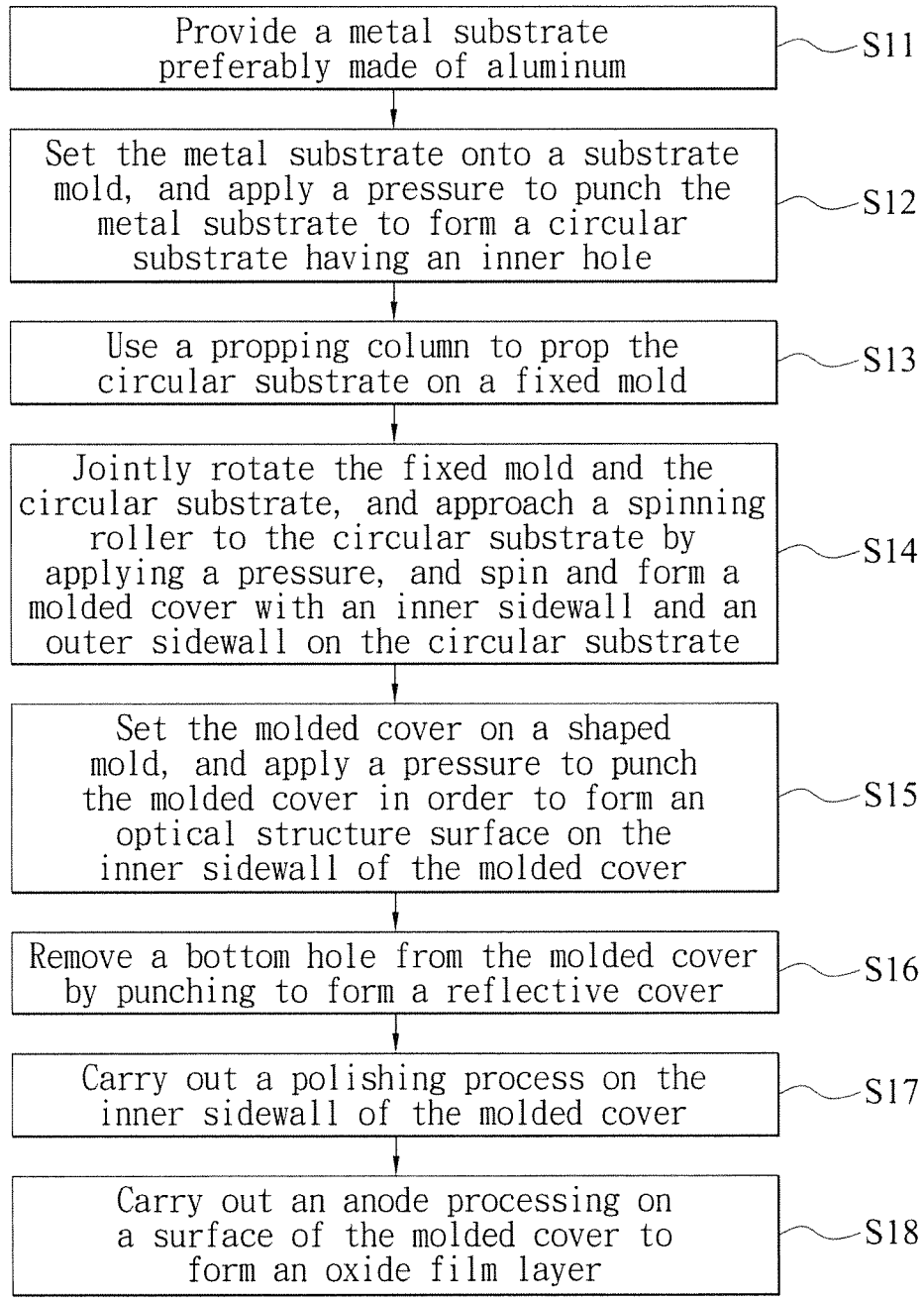
FIG. 1 is a flow chart of a reflective cover manufacturing method in accordance with a preferred embodiment of the present invention.

With reference to FIG. 1 for a flow chart of a reflective cover manufacturing method in accordance with a preferred embodiment of the present invention. In step S11, providing a metal substrate preferably made of aluminum.

In step S12, setting the metal substrate onto a substrate mold, and apply a pressure to punch the metal substrate to form a circular substrate having an inner hole. Wherein, the inner hole is formed at the center position of the circular substrate.

Next, as shown in steps S13 and S14, using a propping column to prop the circular substrate on a fixed mold; and Jointly rotating the fixed mold and the circular substrate, and approach a spinning roller to the circular substrate by applying a pressure to spin and form a molded cover with an inner sidewall and an outer sidewall on the circular substrate.

In step S15, setting the molded cover on a shaped mold, and apply a pressure to punch the molded cover in order to form an optical structure surface on the inner sidewall of the molded cover. It is noteworthy that when the step S14 is carried out, the rotating and pressing techniques will cause a deformation of the external diameter of a cover mouth of the molded cover, so that the molded cover in a fixed shape is formed by the punching technique during the step S15 to fix the shape and size of the molded cover.

Compared with the conventional way of manufacturing the reflective cover simply by the punching method that incurs higher level of difficulty and cost and takes much more manufacturing time for the punching process and resulting in a less production capacity and an inapplicability for different shapes of the reflective covers, or the conventional way of manufacturing the reflective cover by the low-priced spinning method having a low production capacity and a high defective rate and resulting in an unstable quality of the product due to human factors, the method of the present invention can be used for manufacturing high-precision shaped cover bodies to overcome the aforementioned problems.

With reference to the steps S16 to S18, a bottom hole is removed from the molded cover by punching to form a reflective cover in the step S16; a polishing process is carried out on the inner sidewall of the molded cover in the step S17; and an anode processing is carried out on a surface of the molded cover to form an oxide film layer in the step S18. Therefore, the steps S17 and S18 can achieve the effects of changing the surface condition and performance of the molded cover, enhancing the corrosion-resistance, wear-resistance and hardness, and protecting the metal surface.

It is noteworthy that the polishing process as described in the step S17 can polish the surface by a free abrasive grinding, fixed abrasive grinding, soft abrasive grinding-wheel grinding or abrasive-free polishing method, and particularly applicable for a mechanical grinding method including the free grinding method for metal materials, the electromagnetic/electric field grinding method, the micro-particle grinding-wheel grinding method of the fixed grinding method, or the soft grinding-wheel grinding method and a chemical grinding method including the abrasive-free grinding method.

According to the aforementioned reflective cover molding method, a reflective cover can be manufactured, and the precision of the size of the products manufactured by the conventional method can be up to ±0.1 mm only, but the reflective cover molding method of the present invention can have an angle tolerance up to ±2° and a size tolerance up to ±0.05 mm.

Figure 2:
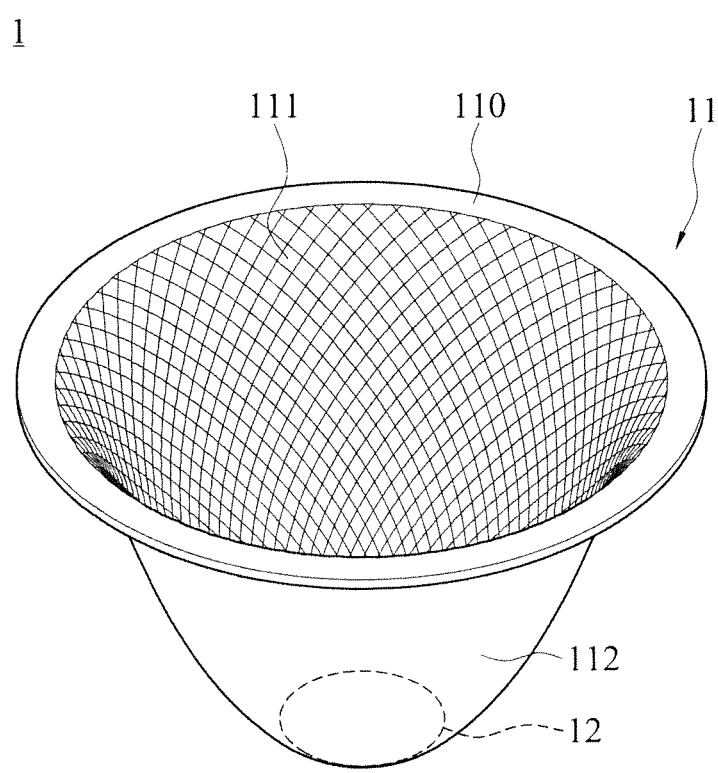
FIG. 2 is a first schematic view of a reflective cover in accordance with a preferred embodiment of the present invention.

With reference to FIGS. 2 to 5 for the first to fifth schematic views of a reflective cover in accordance with a preferred embodiment of the present invention respectively, FIG. 2 shows a reflective cover 1 with a rhombus grid structure manufactured according to the steps S11 to S18 of the reflective cover molding method of the present invention, the reflective cover 1 comprises a molded cover 11 and a bottom hole 12, and the bottom hole 12 is formed at the bottom of the molded cover 11, and an optical structure surface is disposed on an inner sidewall 111 of the molded cover 11, wherein the optical structure surface is a rhombus grid structure, and the outer sidewall 112 has a polished smooth surface.

It is noteworthy that the mouth 110 of the molded cover 11 has an external diameter formed by applying a pressure to punch the molded cover 11 in accordance with the reflective cover molding method of the present invention to form the reflective cover 1 in compliance with the expected quality, wherein the external diameter of the mouth 110 of the reflective cover 1 is a smooth cover mouth.

The theory of secondary optical reflection is used, so that when a light source is passed through the bottom hole 12 and reflected from the molded cover 11 of the present invention, the original light path of the light source is changed to expand the illumination range to achieve a better illumination effect of a lamp.

Figure 3:
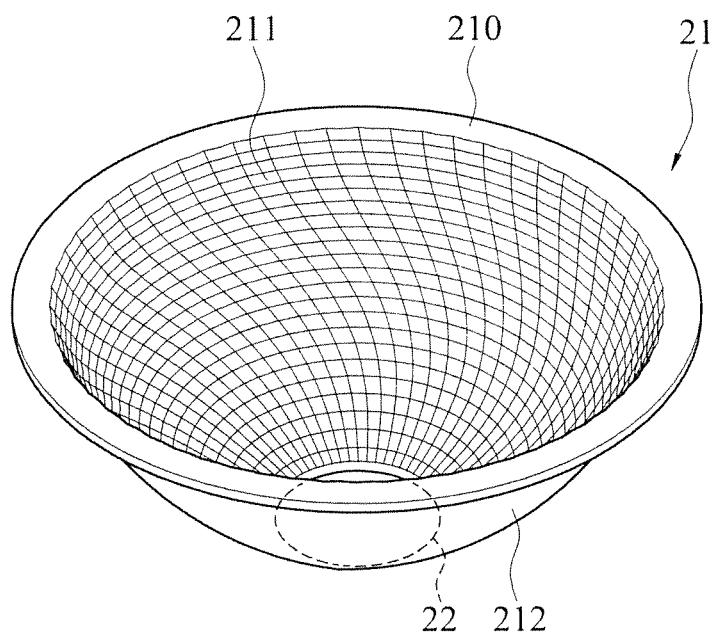
FIG. 3 is a second schematic view of a reflective cover in accordance with a preferred embodiment of the present invention.

In FIG. 3, a reflective cover 2 with a spiral grid structure is manufactured according to the steps S11 to S18 of the reflective cover molding method of the present invention, the reflective cover 2 comprises a molded cover 21 and a bottom hole 22, wherein the bottom hole 22 is formed at the bottom of the molded cover 21, and an optical structure surface is disposed on an inner sidewall 211 of the molded cover 21, wherein the optical structure surface is a spiral grid structure.

Figure 4:
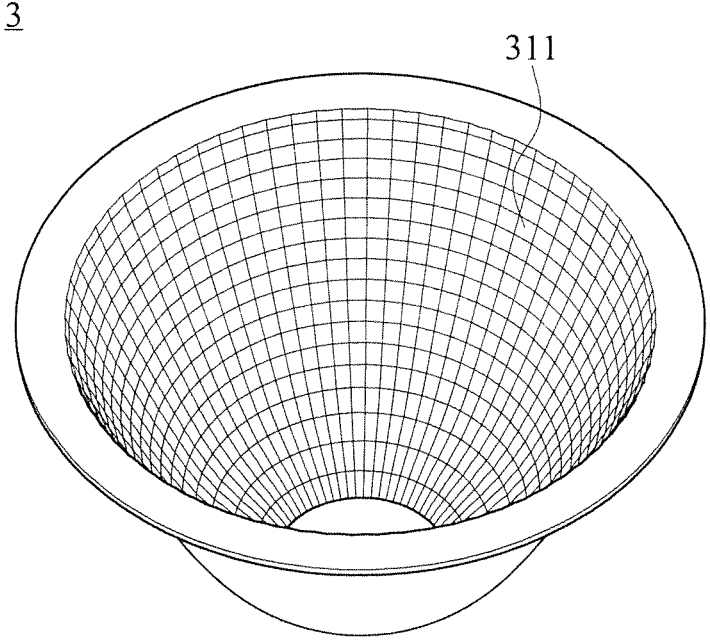
FIG. 4 is a third schematic view of a reflective cover in accordance with a preferred embodiment of the present invention.
Figure 5:
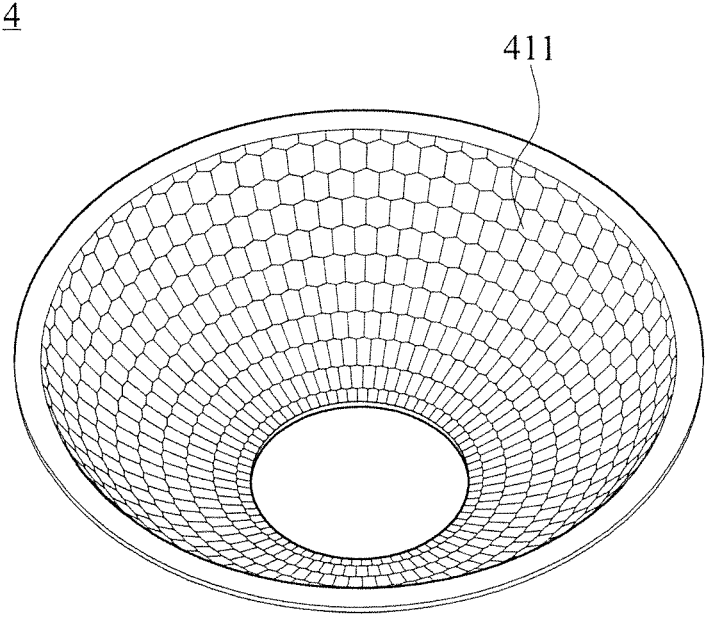
FIG. 5 is a fourth schematic view of a reflective cover in accordance with a preferred embodiment of the present invention.

In FIG. 4, a reflective cover 3 with a rectangular grid structure is manufactured according to the steps S11 to S18 of the reflective cover molding method of the present invention, wherein the rectangular grid structure is disposed on an inner sidewall 311 of the reflective cover 3. In FIG. 5, a reflective cover 4 has an optical structure surface which is a hexagonal grid structure disposed on an inner sidewall 411, so that when a light source is reflected from the inner side of the reflective cover 1, 2, 3 or 4 of the present invention, different optical structure surfaces produce different light paths respectively to achieve a better illumination effect of a lamp.

In addition, it is noteworthy that the figure of the aforementioned optical structure surface is provided for the purpose of illustrating the present invention only, but not intended for limiting the size of the optical structure on the optical structure surface. The reflective cover molding method of the present invention can be used for manufacturing various different optical structure surfaces, and thus the invention is not limited to the embodiments given here.

In summation of the description above, the reflective cover molding method and the reflective cover manufactured thereof in accordance with the present invention have one or more advantages:

(1) In the reflective cover molding method and the reflective cover manufactured thereof in accordance with the present invention, a high precision is achieved, so that a better flexibility of the production of the reflective covers can be achieved according to the required manufacturing sizes and appearance.

(2) In the reflective cover molding method and the reflective cover manufactured thereof in accordance with the present invention, a high precision is achieved, and the angle tolerance has a range of +/−2°, and thus high quality and stability of the manufactured product can be achieve to lower the defective rate.

What is claimed is:

1. A reflective cover molding method, for manufacturing a reflective cover, comprising the steps of:
    providing a metal substrate;
    setting the metal substrate on a substrate mold, and punching the metal substrate by a pressure to form a circular substrate;
    propping the circular substrate onto a fixed mold by a propping column;
    jointly rotating the fixed mold and the circular substrate, applying a pressure by a spinning roller to attach the circular substrate, and applying a pressure to spin out a molded cover;
    setting the molded cover onto a shaped mold, and punching the molded cover by a pressure to form an optical structure surface on the molded cover; and
    punching the molded cover to remove a bottom hole to form the reflective cover.

2. The reflective cover molding method of claim 1, further comprising the step of:
    forming the circular substrate with an inner hole after the metal substrate is punched by a pressure.

3. The reflective cover molding method of claim 1, wherein the step of attaching the jointly rotated the fixed mold and the circular substrate onto the circular substrate by applying a pressure from a spinning roller to spin out a molded cover further comprises the step of applying a pressure to spin and form the molded cover with an inner sidewall and an outer sidewall on the circular substrate, when the spinning roller approaches the circular substrate by applying a pressure.

4. The reflective cover molding method of claim 3, wherein the step of setting the molded cover onto a shaped mold and applying a pressure to punch the molded cover to form an optical structure surface on the molded cover further comprises the step of forming the optical structure surface on the inner sidewall of the molded cover.

5. The reflective cover molding method of claim 3, further comprising the step of executing a polishing process to the inner sidewall of the molded cover, after the bottom hole is cut from the molded cover.

6. The reflective cover molding method of claim 5, further comprising the step of:
    executing an anode processing on the surface of the molded cover to form an oxide film layer after the polishing process is performed on the inner sidewall of the molded cover.

7. The reflective cover molding method of claim 3, wherein the step of setting the molded cover onto a shaped mold and applying a pressure to punch the molded cover in order to form an optical structure surface on the molded cover comprises the step of forming the optical structure surface on the inner sidewall of the molded cover, and the optical structure surface is a spiral grid structure, a rhombus grid structure, a rectangular grid structure or a hexagonal grid structure.

8. A reflective cover manufactured by the reflective cover molding method according to claim 1, comprising: a molded cover and a bottom hole, and the bottom hole being set at the bottom of the molded cover, and an optical structure surface being formed on an inner sidewall of the molded cover.

9. The reflective cover of claim 8, wherein the optical structure surface is a spiral grid structure, a rhombus grid structure, a rectangular grid structure or a hexagonal grid structure.

* * * * *